United States Patent
Roberts et al.

(10) Patent No.: US 11,153,194 B2
(45) Date of Patent: Oct. 19, 2021

(54) CONTROL PLANE ISOLATION FOR SOFTWARE DEFINED NETWORK ROUTING SERVICES

(71) Applicant: Juniper Networks, Inc., Sunnyvale, CA (US)

(72) Inventors: Richard Roberts, Rennes (FR); Anantharamu Suryanarayana, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 228 days.

(21) Appl. No.: 16/396,615

(22) Filed: Apr. 26, 2019

(65) Prior Publication Data

US 2020/0344146 A1  Oct. 29, 2020

(51) Int. Cl.
*H04L 12/751* (2013.01)
*H04L 12/24* (2006.01)

(52) U.S. Cl.
CPC .............. *H04L 45/02* (2013.01); *H04L 41/08* (2013.01); *H04L 41/0823* (2013.01)

(58) Field of Classification Search
CPC . G06F 9/5088; H04L 12/4641; H04L 41/046; H04L 41/0668
See application file for complete search history.

(56) References Cited

U.S. PATENT DOCUMENTS

| 2011/0153715 | A1* | 6/2011 | Oshins | G06F 9/5088 709/203 |
| 2014/0003227 | A1* | 1/2014 | Scudder | H04L 45/021 370/218 |
| 2018/0287905 | A1 | 10/2018 | Mehta et al. | |
| 2019/0050272 | A1* | 2/2019 | Liu | G06F 9/5088 |

FOREIGN PATENT DOCUMENTS

| EP | 2680515 A1 | 1/2014 |
| WO | 2013184846 A1 | 12/2013 |

OTHER PUBLICATIONS

Extended Search Report from counterpart European Application No. 19181599.2, dated Nov. 21, 2019, 8 pp.
Response to Extended Search Report from counterpart European Application No. 19181599.2, filed Apr. 27, 2021, 13 pp.
Hopps, "Analysis of an Equal-Cost Multi-Path Algorithm," RFC 2992,,Network Working Group, Nov. 2000, 8 pp.

* cited by examiner

*Primary Examiner* — Oleg Survillo
*Assistant Examiner* — Christopher P Cadorna
(74) *Attorney, Agent, or Firm* — Shumaker & Sieffert, P.A.

(57) ABSTRACT

Techniques for avoiding single points of failure in routing components of an SDN are disclosed. In some aspects, control nodes that provide routing management services are assigned zone identifiers. The control nodes having one zone identifier can be on separate processes and/or physical hardware from control nodes having a different zone identifier. Workloads, such as virtual machines or containers, can establish routing sessions such as Border Gateway Protocol as a Service (BGPaaS) routing sessions using different zone identifiers to ensure that separate control nodes provide routing management services for the primary and secondary compute nodes associated with a high availability service. These techniques in this way facilitate high availability by ensuring that a control node is not a single point of failure for the high availability service provided by the primary and secondary compute nodes.

20 Claims, 14 Drawing Sheets

CONTROL PLANE ISOLATION FOR SOFTWARE DEFINED NETWORK ROUTING SERVICES

TECHNICAL FIELD

The disclosure relates to computer networks and, more particularly, to configuring network devices and servers.

BACKGROUND

In a typical cloud data center environment, a large collection of interconnected servers provide computing (e.g., compute nodes) and/or storage capacity to run various applications. For example, a data center comprises a facility that hosts applications and services for customers of the data center. The data center, for example, hosts all the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Software Defined Networking (SDN) platforms may be used in data centers, and in some cases, may use a logically centralized and physically distributed SDN controller, and a distributed forwarding plane in virtual routers that extend the network from physical routers and switches in the data center into a virtual overlay network hosted in virtualized servers. The SDN controller provides management, control, and analytics functions of a virtualized network and orchestrates the virtual routers by communicating with the virtual routers.

In some cases, the compute nodes may be organized to provide redundant services. For example, a first compute node may be configured as a primary provider of a firewall service while a second compute node may be configured as a secondary or backup firewall service to the primary firewall service. Configuring the compute nodes in this manner can be used to provide what is referred to as "high availability." That is, the firewall service may be a high availability service because the firewall service on a primary compute node can be rapidly migrated to the firewall service configured on the secondary compute node should the primary compute node fail. The migration can occur so that the user experiences little or no downtime of the firewall service.

SUMMARY

In general, the disclosure describes techniques for avoiding single points of failure in routing components for configuring compute nodes of a software-defined network. In some aspects, control nodes that provide routing management services are assigned zone identifiers. The control nodes having one zone identifier can be on separate processes and/or physical hardware from control nodes having a different zone identifier. Workloads, such as virtual machines or containers, can establish routing sessions such as Border Gateway Protocol as a Service (BGPaaS) routing sessions using different zone identifiers to ensure that separate control nodes provide routing management services for the primary and secondary compute nodes associated with a high availability service. These techniques in this way facilitate high availability by ensuring that a control node is not a single point of failure for the high availability service provided by the primary and secondary compute nodes.

In one example aspect, a method includes establishing, by a first workload, a first routing session with a first control node based, at least in part, on a first zone identifier, wherein the first workload is configured as a primary provider of a service; establishing, by a second workload, a second routing session with a second control node based, at least in part, on a second zone identifier, the second zone identifier different than the first zone identifier, wherein the second workload is configured as a secondary provider of the service; receiving one or more first service requests for the service by the first workload via a first virtual router managed by the first control node; in response to detecting a failure of the first control node, migrating the service to the second workload; and receiving one or more second service requests for the service by the second workload via a second virtual router managed by the second control node.

In another example aspect, a system includes a first control node assigned a first zone identifier; a second control node assigned a second zone identifier; a first workload configured to establish a first routing session with the first control node based, at least in part, on the first zone identifier, wherein the first workload is configured as a primary provider of a service; and a second workload configured to establish a second routing session with the second control node based, at least in part, on the second zone identifier, wherein the second workload is configured as a secondary provider of the service; wherein the first workload is further configured to receive one or more first service requests via a virtual router managed by the first control node; and wherein the SDN system is configured to, in response to detection of a failure of the first control node, migrate the service to the second workload, wherein the second workload is further configured to receive one or more second service requests via a virtual router managed by the second control node.

In a further example aspect, a method comprises establishing, by a first virtual router, a first communication session with a first control node based, at least in part, on a first zone identifier, wherein the first virtual router is configured to provide a first virtual network to a first workload configured as a primary provider of a service; establishing, by a second virtual router, a second communication session with a second control node based, at least in part, on a second zone identifier, the second zone identifier different than the first zone identifier, wherein the second virtual router is configured to provide a second virtual network to a second workload configured as a secondary provider of the service; receiving one or more first service requests for the service by the first workload via the first virtual router; in response to detection of a failure of the first control node, migrating the service to the second workload; and receiving one or more second service requests for the service by the second workload via the second virtual router.

The details of one or more examples are set forth in the accompanying drawings and the description below. Other features, objects, and advantages will be apparent from the description and drawings, and from the claims.

DETAILED DESCRIPTION

Figure 1:
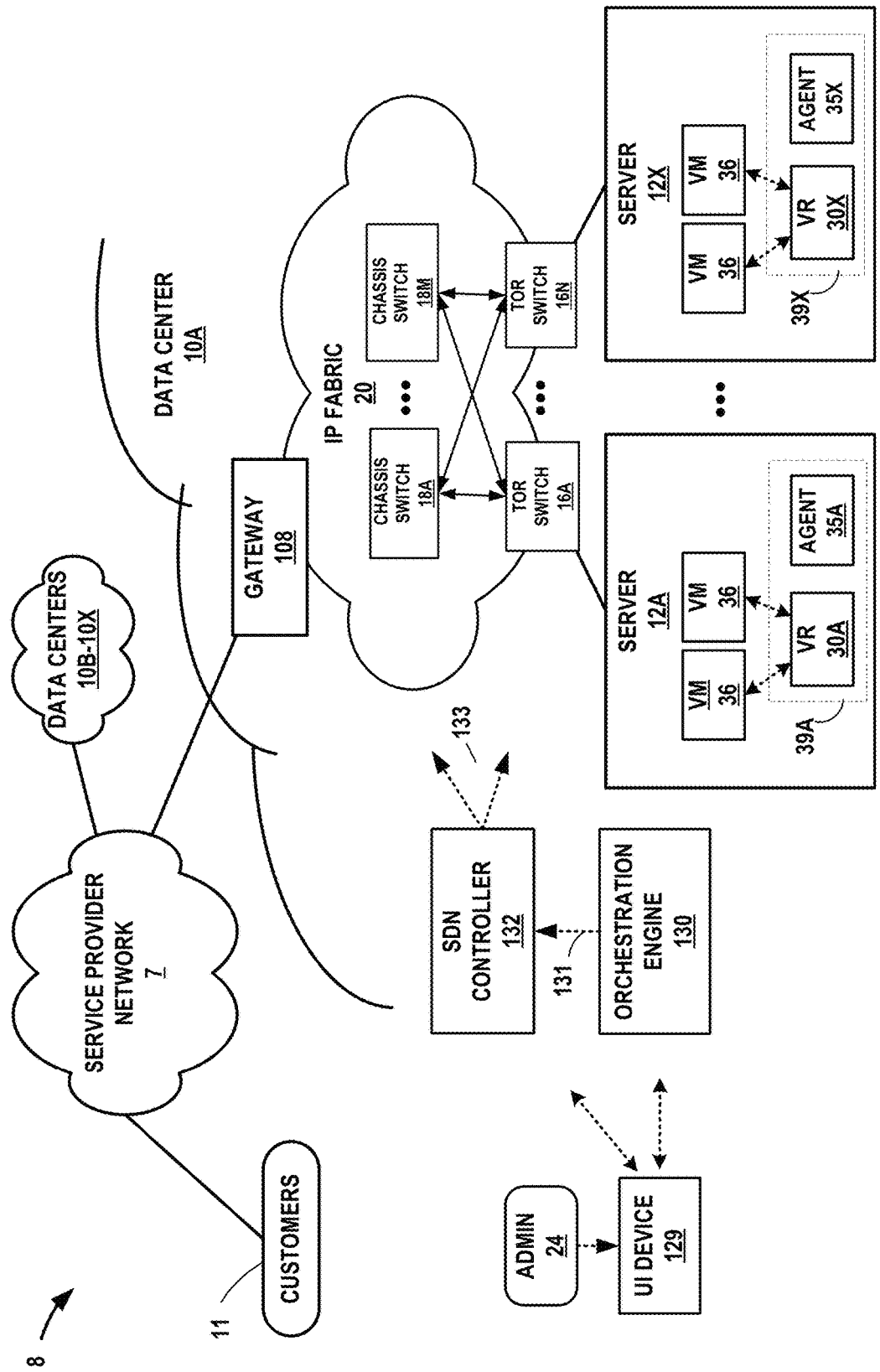
FIG. 1 is a block diagram illustrating an example computer network system in accordance with techniques described herein.

A cluster of redundant nodes (referred to as an "SDN controller" or "control nodes") may be responsible for performing routing on behalf of "compute nodes" that execute production workloads such as virtual machines or containers. In other words, compute nodes (i.e., "routing clients") may delegate routing to one or more control nodes (i.e., "routing servers"). The selection of an SDN controller or control nodes to which delegation happens can be non-deterministic or complex. Described herein are systems, methods, and computer-readable media to control routing association between routing clients and routing servers. Note that for high availability purposes, several instances of control nodes can be running independently while synchronizing their routing states for consistency using routing protocols.

Two use cases will now be presented to further illustrate certain techniques of the disclosure. The first use case will be directed to a workload plane, the second use case will be directed to a compute plane. In a workload plane, a workload (i.e. a virtual machine or container) can run a routing protocol (e.g. Border Gateway Protocol (BGP)) to dynamically synchronize forwarding within an SDN system. A dedicated routing association (e.g. a BGP peer) can be enforced between the workload and the SDN controller. The compute node (i.e., "routing client") where the workload is hosted may delegate the routing association to an SDN controller (i.e., "routing server"). Ultimately, the routing association may therefore be virtually established between the workload and the SDN Controller, while the compute node hosting the workload relays routing traffic between these elements.

A method for use by a compute node for relaying traffic can typically be Network Address Translation, tunneling or native protocol reflection capabilities such as BGP Route Reflector. However, this approach may not be optimal to deploy critical services with High Availability (HA) requirements (e.g. mobile services). Generally, HA services can be based on service replication and non-fate-sharing elements. However, this approach can introduce a potential single point of failure, as will be further described below.

In the second use case (the compute node use case), compute nodes synchronize their routing states with an SDN Controller. Dedicated routing association(s) may therefore be enforced between the compute node and SDN control node(s). In this case, high availability may be natively provided as a result of the two native routing associations to distinct SDN control nodes. In some aspects, the use of zone identifiers to control the selection of the routing association between compute nodes and SDN control nodes may offer benefits to operations. For example, in some aspects, the use of zone identifiers as described herein may facilitate the migration of compute nodes routing association to a deterministic set of SDN control nodes, while isolating the remaining SDN control nodes in preparation for maintenance operations that may have an impact on routing.

Additionally, in some aspects, the techniques described herein may offer more operation control during an In State Service Upgrade (ISSU) as a result of the selection of an SDN control node to assign to a routing association. In other words, the techniques described herein can facilitate choosing to establish a compute node routing association to an SDN control node having version A software versus other control nodes that may have version A' software.

In some aspects, the techniques described herein may provide a more standard integration in the routing ecosystem where redundancy is traditionally managed with two deterministic nodes which can streamline the path selection decision of routing protocols (e.g. Multiprotocol Extensions for BGP (MP-BGP)).

A configuration object referred to as a "routing zone" having an associated zone identifier is described herein. In some aspects, routing zones may be defined globally in an SDN cluster through configuration. The routing zone may be configured as a property of individual SDN control nodes. The mapping between routing zones and control nodes can be flexible. For example, an SDN control node can have one or more routing zones attached to it. Further, a routing zone can be referenced by multiple SDN control nodes. A binding to a routing zone can be configured for routing associations.

As an example of the first use case described above, assume that there are n SDN control nodes: CN1, CN2, . . . CNn (n>1, typically n=3). Further assume a redundant service (e.g., a high availability service) is configured on two virtual machines (VMs, VMA and VMB). Using the techniques described herein, n zones (Zi) can be created that, in some aspects, can map canonically 1:1 to CNi (SDN control nodes). A user can configure the "routing association" for VMA (e.g. BGP peer) with a routing zone "Z1" property. Further, a user can configure the routing association for VMB (e.g. BGP peer) with a routing zone "Z2" property. The above design results in having the VMA routing association achieved with the CN1 SDN control node, while the VMB routing association is achieved with the CN2 SDN control node. As a result, the VMA and VMB are associated to distinct SDN control nodes, which solves the High Availability problem described earlier.

As an example of the second use case, assume that there are n SDN control nodes CN1, CN2, CNn (n>1, typically n=3). Further assume a set of compute nodes CPT1 . . . CPTx. A user can define two routing zones: a Global Zone and a Maintenance Zone. The user can create a configuration that binds a first set of CPTi compute nodes to the Global Zone. Some or all of the remaining compute nodes CPTi+1 to CPTx can be bound to the Maintenance Zone. This design can ensure that no SDN control node in the Maintenance Zone is handling the routing for any compute node hosting a production workload (i.e., a compute node bound to the Global Zone. Thus, maintenance operations can be carried out without affecting production operations.

FIG. 1 is a block diagram illustrating an example computer network system 8 in accordance with techniques described herein. The example computer network system 8 can be configured and operated using the techniques described below with respect to FIGS. 2, 3A-3E, 4, 5, 6 and 7A-7C.

Computer network system 8 in the example of FIG. 1 includes data centers 10A-10X (collectively, "data centers 10") interconnected with one another and with customer networks associated with customers 11 via a service provider network 7. FIG. 1 illustrates one example implementation of computer network system 8 and a data center 10A that hosts one or more cloud-based computing networks, computing domains or projects, generally referred to herein as cloud computing cluster. The cloud-based computing clusters may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments or other computing clusters, domains, networks and the like. Other implementations of computer network system 8 and data center 10A may be appropriate in other instances. Such implementations may include a subset of the components included in the example of FIG. 1 and/or may include additional components not shown in FIG. 1. Data centers 10B-10X may include the same or similar features and be configured to perform the same or similar functions as described herein with respect to data center 10A.

In the example shown in FIG. 1, data center 10A provides an operating environment for applications and services for customers 11 coupled to data center 10A by service provider network 7 through gateway 108. Although functions and operations described in connection with computer network system 8 of FIG. 1 may be illustrated as being distributed across multiple devices in FIG. 1, in other examples, the features and techniques attributed to one or more devices in FIG. 1 may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1 or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Data center 10A hosts infrastructure equipment, such as networking and storage systems, redundant power supplies, and environmental controls. Service provider network 7 may be coupled to one or more networks administered by other providers, and may thus form part of a large-scale public network infrastructure, e.g., the Internet. In some examples, data center 10A may represent one of many geographically distributed network data centers. As illustrated in the example of FIG. 1, data center 10A is a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific, or super-computing, and so on. In some examples, data center 10A is an individual network server, a network peer, or otherwise.

In the example of FIG. 1, data center 10A includes a set of storage systems and application servers, including server 12A through server 12X (collectively "servers 12") interconnected via high-speed switch fabric 20 provided by one or more tiers of physical network switches and routers. Servers 12 function as physical compute nodes of the data center. For example, each of servers 12 may provide an operating environment for execution of one or more application workloads. As described herein, the terms "application workloads" or "workloads" may be used interchangeably to refer to application workloads. Workloads may execute on a virtualized environment, such as a virtual machine 36, a container, or some of type of virtualized instance, or in some cases on a bare metal server that executes the workloads directly rather than indirectly in a virtualized environment. Each of servers 12 may be alternatively referred to as a host computing device or, more simply, as a host. A server 12 may execute one or more of workloads 37 on one or more virtualized instances, such as virtual machines 36, containers, or other virtual execution environment for running one or more services (such as virtualized network functions (VNFs)). Some or all of the servers 12 can be bare metal servers (BMS). A BMS can be a physical server that is dedicated to a specific customer or tenant.

Switch fabric 20 may include top-of-rack (TOR) switches 16A-16N coupled to a distribution layer of chassis switches 18A-18M, and data center 10A may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10A includes servers 12A-12X interconnected via the high-speed switch fabric 20 provided by one or more tiers of physical network switches and routers. Switch fabric 20 is provided by the set of interconnected top-of-rack (TOR) switches 16A-16N (collectively, "TOR switches 16") coupled to the distribution layer of chassis switches 18A-18M (collectively, "chassis switches 18"). In some examples, chassis switches 18 may operate as spine nodes and TOR switches 16 may operate as leaf nodes in data center 10A. Although not shown, data center 10A may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to gateway 108 and service provider network 7. Chassis switches 18 aggregate traffic flows and provide high-speed connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to gateway 108, which may perform layer 3 routing to route network traffic between data center 10A and customers 11 by service provider network 7.

Switch fabric 20 may perform layer 3 routing to route network traffic between data center 10A and customers 11 by service provider network 7. Gateway 108 acts to forward and receive packets between switch fabric 20 and service provider network 7. Data center 10A includes an overlay network that extends switch fabric 20 from physical switches 18, 16 to software or "virtual" switches. For example, virtual routers 30A-30X located in servers 12A-12X, respectively, may extend the switch fabric 20 by communicatively coupling with one or more of the physical switches located within the switch fabric 20. Virtual switches may dynamically create and manage one or more virtual networks usable for communication between application instances. In one example, virtual routers 30A-30X execute the virtual network as an overlay network, which provides the capability to decouple an application's virtual address from a physical address (e.g., IP address) of the one of servers 12A-12X on which the application is executing. Each virtual network may use its own addressing and security scheme and may be viewed as orthogonal from the physical network and its addressing scheme. Various techniques may be used to transport packets within and across virtual network(s) over the physical network.

Software-Defined Networking ("SDN") controller 132 provides a logically and in some cases physically centralized controller for facilitating operation of one or more virtual networks within data center 10A in accordance with one or more examples of this disclosure. The terms SDN controller and Virtual Network Controller ("VNC") may be used interchangeably throughout this disclosure. In some examples, SDN controller 132 operates in response to configuration input received from orchestration engine 130 via a northbound API 131, which in turn operates in response to configuration input received from an administrator 24 operating user interface device 129. In some aspects, the SDN controller 132 may be part of a high availability (HA) cluster and provide HA cluster configuration services. Additional information regarding SDN controller 132 operating in conjunction with other devices of data center 10A or other software-defined networks is found in International Application Number PCT/US2013/044378, filed Jun. 5, 2013, and entitled "PHYSICAL PATH DETERMINATION FOR VIRTUAL NETWORK PACKET FLOWS," and in U.S. patent application Ser. No. 15/476,136, filed Mar. 31, 2017 and entitled, "SESSION-BASED TRAFFIC STATISTICS LOGGING FOR VIRTUAL ROUTERS," wherein both applications are incorporated by reference in their entirety as if fully set forth herein.

For example, SDN platforms may be used in data center 10 to control and manage network behavior. In some cases, an SDN platform includes a logically centralized and physically distributed SDN controller, such as SDN controller 132, and a distributed forwarding plane in the form of virtual routers 30 that extend the network from physical routers and switches in the data center switch fabric into a virtual overlay network hosted in virtualized servers.

In some examples, SDN controller 132 manages the network and networking services such load balancing, security, network configuration, and allocation of resources from servers 12 to various applications via southbound API 133. That is, southbound API 133 represents a set of communication protocols utilized by SDN controller 132 to make the actual state of the network equal to the desired state as specified by orchestration engine 130. One such communication protocol may include a messaging communications protocol such as XMPP, for example. For example, SDN controller 132 implements high-level requests from orchestration engine 130 by configuring physical switches, e.g. TOR switches 16, chassis switches 18, and switch fabric 20; physical routers; physical service nodes such as firewalls and load balancers; and virtual services such as virtual firewalls in a virtualized environment. SDN controller 132 maintains routing, networking, and configuration information within a state database. SDN controller 132 communicates a suitable subset of the routing information and configuration information from the state database to virtual routers (VR) 30A-30X or agents 35A-35X ("AGENT" in FIG. 1) on each of servers 12A-12X.

As described herein, each of servers 12 include a respective forwarding component 39A-39X (hereinafter, "forwarding components 39) that performs data forwarding and traffic statistics collection functions for workloads executing on each server 12. In the example of FIG. 1, each forwarding component is described as including a virtual router ("VR 30A-VR 30X" in FIG. 1) to perform packet routing and overlay functions, and a VR agent ("VA 35A-35X" in FIG. 1) to communicate with SDN controller 132 and, in response, configure the virtual routers 30.

In this example, each virtual router 30A-30X implements at least one routing instance for corresponding virtual networks within data center 10 and routes the packets to appropriate virtual machines, containers, or other workloads executing within the operating environment provided by the servers. Packets received by the virtual router of server 12A, for instance, from the underlying physical network fabric may include an outer header to allow the physical network fabric to tunnel the payload or "inner packet" to a physical network address for a network interface of server 12A that executes the virtual router. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In the example of FIG. 1, SDN controller 132 learns and distributes routing and other information (such as configuration) to all compute nodes in the data center 10. The VR agent 35 of a forwarding component 39 running inside the compute node, upon receiving the routing information from SDN controller 132, typically programs the data forwarding element (virtual router 30) with the forwarding information. SDN controller 132 sends routing and configuration information to the VR agent 35 using a messaging communications protocol such as XMPP protocol semantics rather than using a more heavy-weight protocol such as a routing protocol like BGP. In XMPP, SDN controller 132 and agents communicate routes and configuration over the same channel. SDN controller 132 acts as a messaging communications protocol client when receiving routes from a VR agent 35, and the VR agent 35 acts as a messaging communications protocol server in that case. Conversely, SDN controller 132 acts as a messaging communications protocol server to the VR agent 35 as the messaging communications protocol client when the SDN controller sends routes to the VR agent 35. SDN controller 132 may send security policies to VR agents 35 for application by virtual routers 30.

User interface device 129 may be implemented as any suitable computing system, such as a mobile or non-mobile computing device operated by a user and/or by administrator 24. User interface device 129 may, for example, represent a workstation, a laptop or notebook computer, a desktop computer, a tablet computer, or any other computing device that may be operated by a user and/or present a user interface in accordance with one or more aspects of the present disclosure.

In some examples, orchestration engine 130 manages functions of data center 10A such as compute, storage, networking, and application resources. For example, orchestration engine 130 may create a virtual network for a tenant within data center 10A or across data centers. Orchestration engine 130 may attach workloads (WLs) to a tenant's virtual network. Orchestration engine 130 may connect a tenant's virtual network to an external network, e.g. the Internet or a VPN. Orchestration engine 130 may implement a security policy across a group of workloads or to the boundary of a tenant's network. Orchestration engine 130 may deploy a network service (e.g. a load balancer) in a tenant's virtual network.

In some examples, SDN controller 132 manages the network and networking services such load balancing, security, and allocate resources from servers 12 to various applications via southbound API 133. That is, southbound API 133 represents a set of communication protocols utilized by SDN controller 132 to make the actual state of the network equal to the desired state as specified by orchestration engine 130. For example, SDN controller 132 implements high-level requests from orchestration engine 130 by configuring physical switches, e.g. TOR switches 16, chassis switches 18, and switch fabric 20; physical routers; physical service nodes such as firewalls and load balancers; and virtual services such as virtual firewalls in a VM. SDN controller 132 maintains routing, networking, and configuration information within a state database.

Typically, the traffic between any two network devices, such as between network devices (not shown) within switch fabric 20 or between servers 12 and customers 11 or between servers 12, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular traffic flow over a single deterministic path.

Virtual routers (virtual router 30A to virtual router 30X, collectively "virtual routers 30" in FIG. 1) execute multiple routing instances for corresponding virtual networks within data center 10A and routes the packets to appropriate workload executing within the operating environment provided by servers 12. Each of servers 12 may include a virtual router. Packets received by virtual router 30A of server 12A, for instance, from the underlying physical network fabric may include an outer header to allow the physical network fabric to tunnel the payload or "inner packet" to a physical network address for a network interface of server 12A. The outer header may include not only the physical network address of the network interface of the server but also a virtual network identifier such as a VxLAN tag or Multi-protocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

SDN controller 132 can be implemented by control nodes that can be distributed across many physical devices and that provide routing services for physical and virtual machines in a data center. Any one of the control nodes can represent a single point of failure. In accordance with techniques described herein, control nodes of distributed SDN controller 132 that provide routing management services to virtual machines 36 or that provide other services to the virtual machines 36 or the virtual routers 30 are assigned zone identifiers. In effect, workloads or virtual routers 30 delegate such services to and are clients of the routing nodes. The control nodes having one zone identifier can be on separate processes and/or physical hardware from control nodes having a different zone identifier to reduce the likelihood of a single point of failure. Workloads, such as virtual machines or containers, can establish routing sessions such as Border Gateway Protocol as a Service (BGPaaS) routing sessions using different zone identifiers to ensure that separate control nodes provide routing management services for the primary and secondary compute nodes or primary and secondary workloads associated with a high availability service.

A practical application of the techniques described in further detail below is that the techniques allow for a deterministic configuration of control nodes providing routing services for virtual machines in the data center. For example, a zone identifier can provide an extra level of indirection to facilitate control of the delegation of routing in an SDN routing architecture. This routing zone relationship between "routing clients" to "routing servers," introduces an abstracted and deterministic control of routing associations that can facilitate the provision of Highly Available services.

The techniques can be advantageous because in some aspects, the techniques can reduce or even eliminate the probability that a control node is a single point of failure. Further, the techniques can be advantageous because they can provide an easy and efficient way to segregate operations performed on control nodes such as operations to upgrade software on control nodes of a data center.

Figure 2:
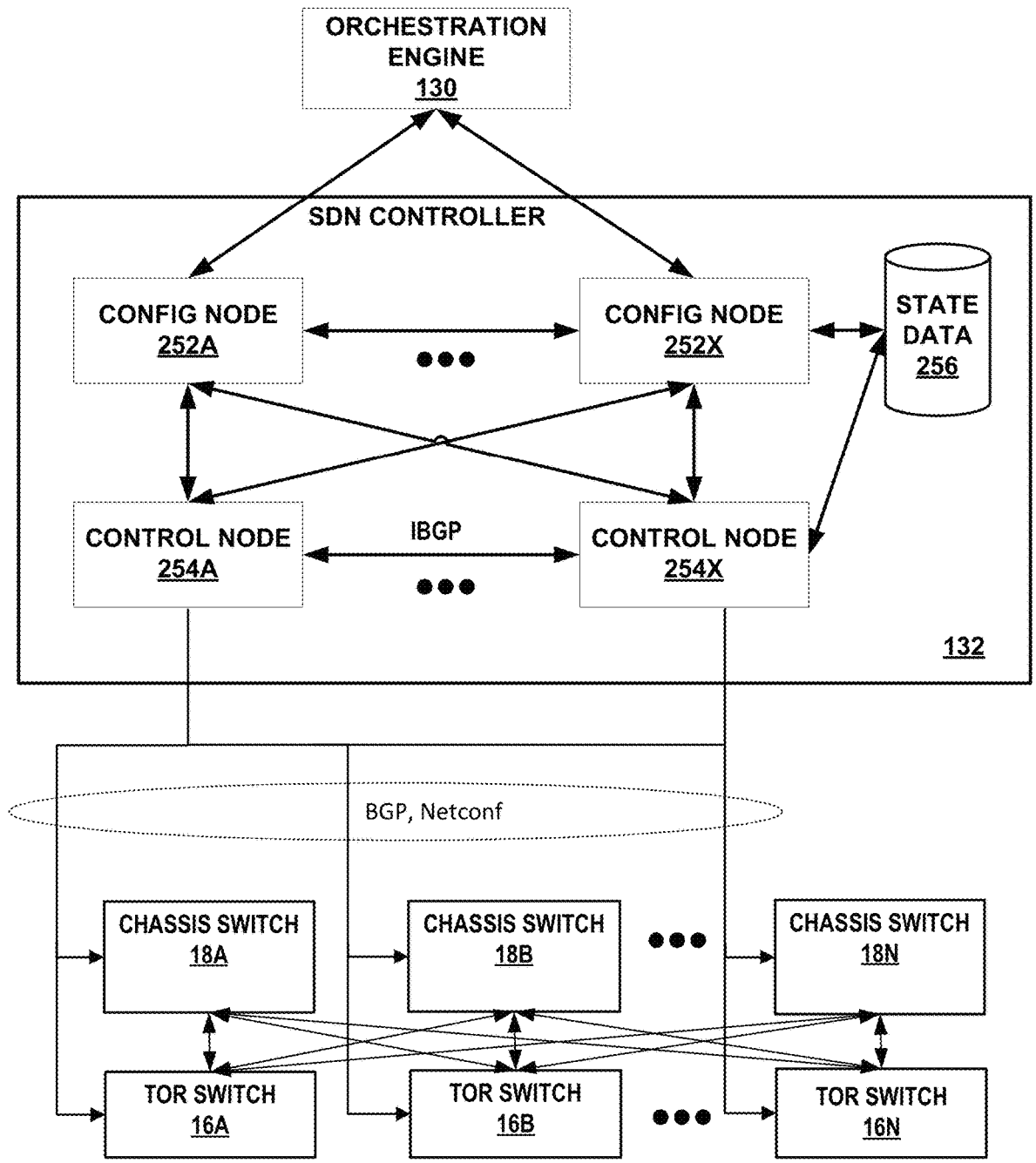
FIG. 2 is a block diagram illustrating an example implementation of the SDN controller of FIG. 1 in further detail.

FIG. 2 is a block diagram illustrating an example implementation of the SDN controller 132 of FIG. 1 in further detail. SDN controller 132 can include one or more configuration nodes 252A-252X (collectively, "configuration nodes 252") and control nodes 254A-254X (collectively, "control nodes 254"). In general, each of the nodes 252 and 254 may be implemented as a separate software process, and the nodes may be distributed across multiple hardware computing platforms that provide an environment for execution of the software. Moreover, each of the nodes may maintain state data 256, which may be stored within a centralized or distributed database. In some examples, state database 256 is a NoSQL database. In some examples, state database 256 is a database cluster.

Configuration nodes 252 can translate the high-level data model of orchestration engine 130 into lower level models suitable for interacting with network elements, such as physical switches 16, 18. Configuration nodes 252 can keep a persistent copy of the configuration state of SDN controller 132 within state database 256.

Control nodes 254 implement a logically centralized control plane responsible for maintaining ephemeral network state. Control nodes 254 interact with each other and with network elements, such as physical switches 16, 18, to ensure that the network state is eventually consistent with desired state as specified by orchestration engine 130. In general, control nodes 254 receive configuration state of SDN controller 132 from configuration nodes 252, and exchange routes with each other via IBGP to ensure that all control nodes 254 have the same network state. Further, control nodes 254 exchange routes with physical switches 16, 18 via BGP or Netconf. Control nodes 254 communicate the configuration state information, such as routing instances and forwarding policy, to physical switches 16, 18, e.g., via BGP or Netconf, for installation within physical switches 16, 18. Further, control nodes 254 exchange routes with physical switches 16, 18 via BGP, and exchange the configuration state of SDN controller 132 with physical switches 16, 18 via Netconf. In accordance with the techniques of the disclosure, one or more control nodes 254 configure an underlay network on switches 16, 18.

Configuration nodes 252 provide a discovery service that tenants of data center 10 may use to locate various services available within an SDN. For example, if a physical switch 16, 18 attempts a connection with control node 254A, it uses a discovery service provided by configuration nodes 252 to discover the IP address of control node 254A. Physical switches 16, 18 may use local configuration, DHCP or DNS to locate the service discovery server within configuration nodes 252.

In some examples, configuration nodes 252 present northbound API that interfaces with orchestration engine 130. Orchestration engine 130 uses this interface to install configuration state using the high-level data model. Configuration nodes 252 further include a message bus to facilitate communications amongst internal components. Configuration nodes 252 further include a transformer that discovers changes in the high-level model of orchestration engine 130 and transforms these changes into corresponding changes in the low level data model managed by SDN controller 132. In some examples, configuration nodes 252 further include a server that provides a southbound API to push computed low-level configuration down to control nodes 254.

Figure 3A:
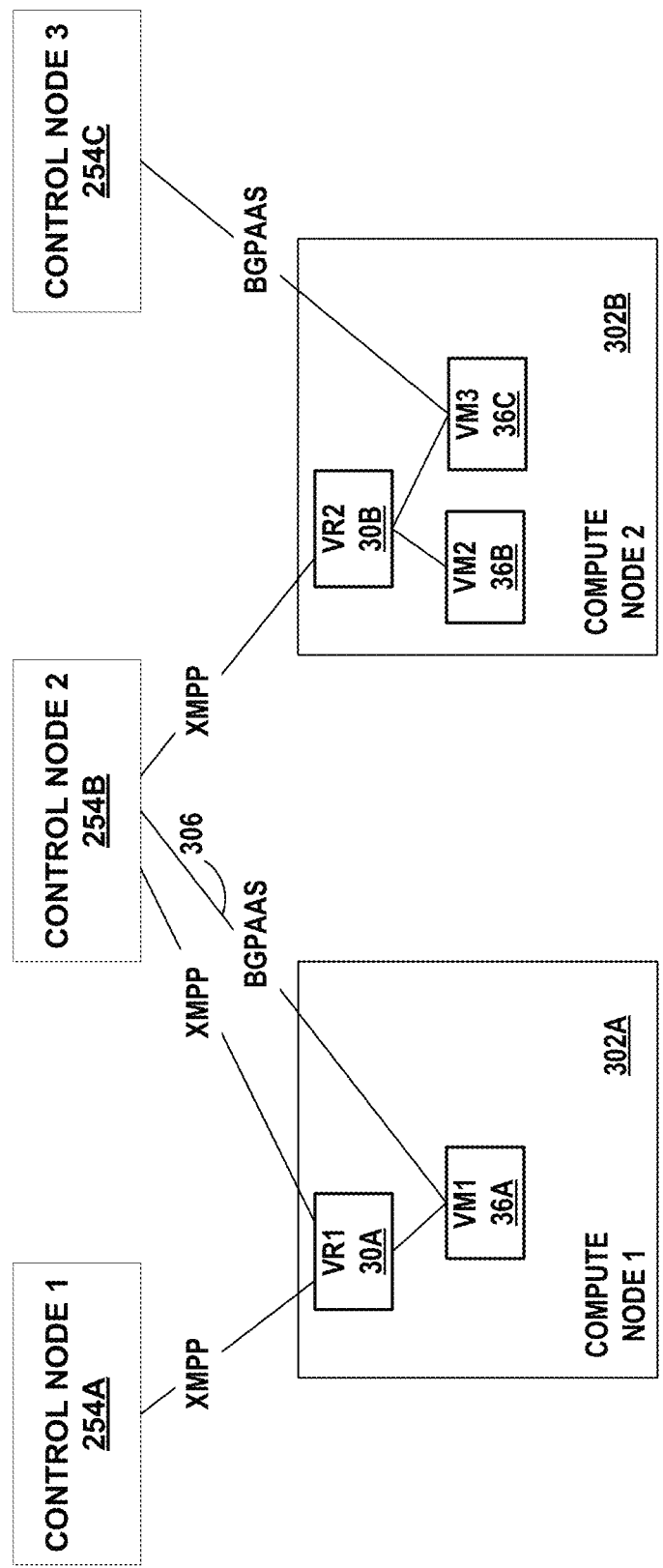
FIGS. 3A-3F are block diagrams illustrating example network routing associations in accordance with techniques described herein.

FIGS. 3A-3F are block diagrams illustrating example network routing associations in accordance with techniques described herein. FIG. 3A illustrates an example non-deterministic routing association. In the example of FIG. 3A, three control nodes (254A, 254B and 254C) are communicably coupled to two compute nodes (302A and 302B). While three control nodes may be desirable, it will be appreciated that other numbers of control nodes may be used. As discussed above, the control nodes 254 can configure and manage routers and switches that provide routing services for compute nodes 302A and 302B. As examples, the control nodes 254 can provide configuration data to virtual routers (e.g., VR1 301 and VR2 30B) on a compute node (302A and 302B). A virtual machine (36A, 36B or 36C) may establish a routing session with a control node (254A, 254B, or 254C). In the example illustrated in FIG. 3A, virtual machine VM1 36A has established a routing session 306 with control node 2 254B. In some aspects, routing sessions between virtual machines and control nodes can use the BGPaaS protocol. VM1 36A can provide routing information to control node 2 254B such as the IP addresses associated with the virtual machine.

Control nodes can push routing configuration information to virtual routers on compute nodes. In the example illustrated in FIG. 3A, control node 2 254B can push routing configuration information to VR1 30A and VR2 30B. In some aspects, the control nodes 254 can exchange information with VRs 30 using the Extensible Messaging and Presence Protocol (XMPP) protocol.

In the example illustrated in FIG. 3A, control nodes 254 are bound with (i.e., associated with) virtual machines 36 in a non-deterministic manner. That is, a control node is bound to a virtual machine in a way where the virtual machine 36 does not determine how the control node 254 is selected. For example, a random selection mechanism, load balancing mechanism, or hashing mechanism may be used to bind control nodes to virtual machines.

Figure 3B:
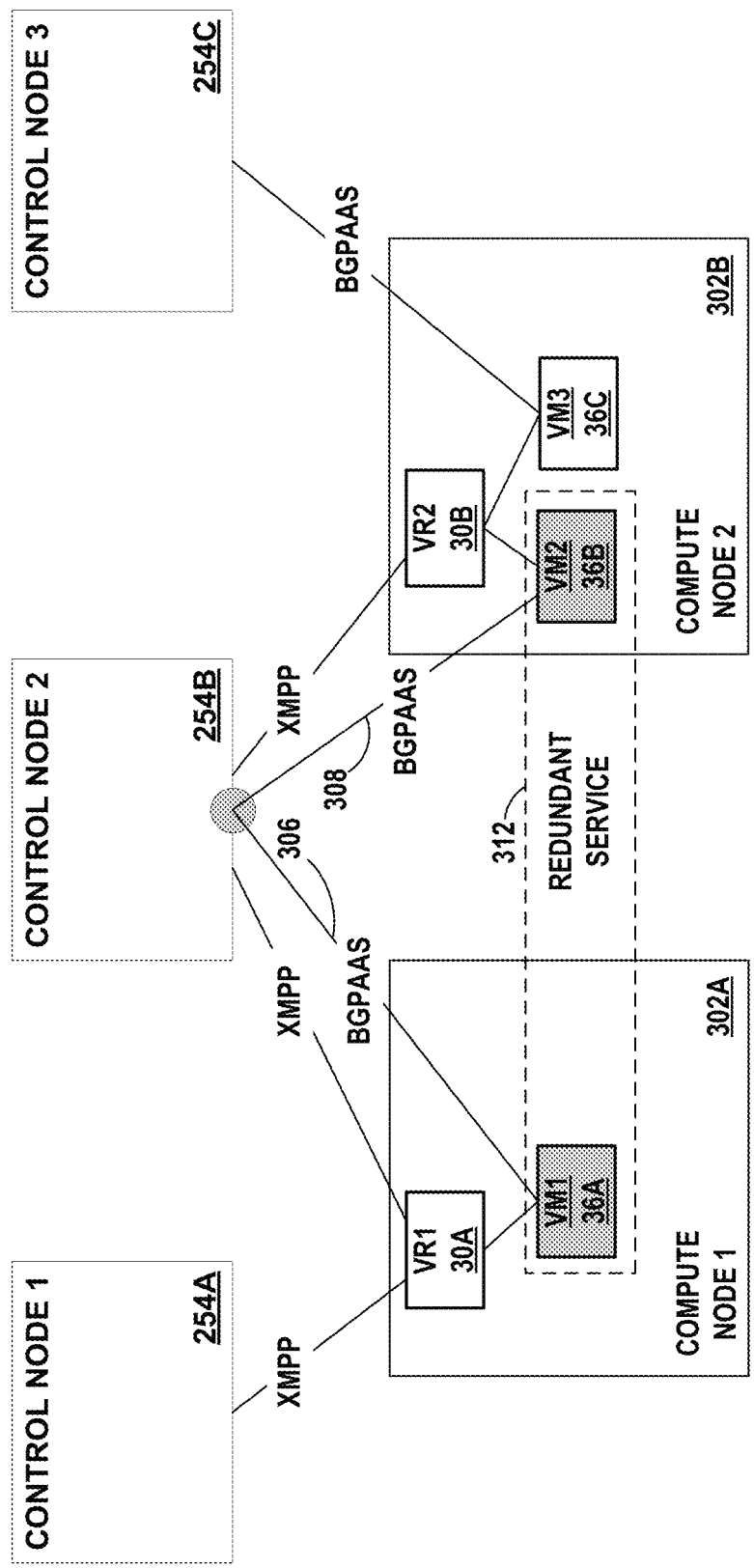

FIG. 3B illustrates an example non-deterministic routing association with respect to a high availability service. In the example illustrated in FIG. 3B, a redundant service 312 is implemented by VM1 36A and VM2 36B. The redundant service can be a high availability service, a load sharing service, a disaster recovery service etc. As an example, the redundant service 312 may be a firewall service that is configured for high availability. In the example illustrated in FIG. 3B, a non-deterministic binding algorithm has caused VM1 36A and VM2 36B to bind with the same control node (i.e., control node 2 254B) via routing sessions 306 and 310. Redundant service 312 may continue to be provided even in the case that either VM1 36A or VM2 36B fails. However, because both VMs are bound to control node 2 254B, a failure of control node 2 254B may result in redundant service 312 becoming unavailable. In other words, in case of failure of control node 2 254B, routing for both VM1 36A and VM2 36B can be affected, which can break the high availability logic: the service may be down until new routing associations are created, which can take an unacceptably long period of time (e.g., minutes). Thus, control node 2 254B is a single point of failure in the example illustrated in FIG. 3B.

Figure 3C:
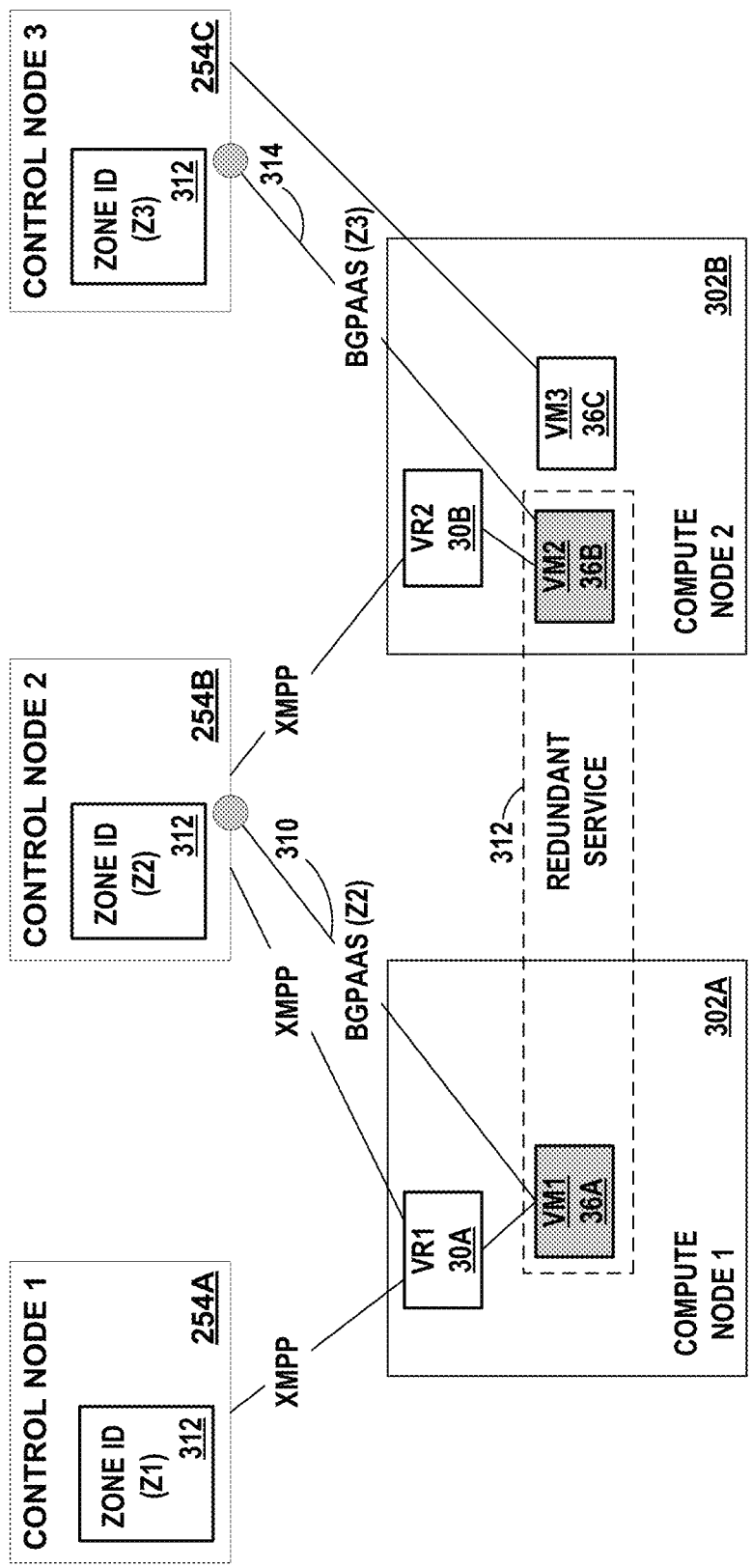

FIG. 3C illustrates an example deterministic routing association with respect to a high availability service. In the example illustrated in FIG. 3C, each of the control nodes 254A, 254B and 254C have been assigned a zone identifier (ID) 312 during a configuration process. For example, control node 1 254A has been assigned a zone identifier 312 of "Z1," control node 2 254B has been assigned a zone identifier 312 of "Z2," and control node 3 254C has been assigned a zone identifier 312 of "Z3." A zone identifier 312 may be used by VMs 36 to bind (i.e., associate) with a control node in a deterministic manner. For example, a zone ID 312 can be used to create a zone (i.e., an associated set) of one or more control nodes 254. A VM 36 can specify a value for the zone ID 312 when establishing a routing session (e.g., a BGPaaS session). The SDN system will bind the VM to one of the one or more control nodes that are in the specified zone. A zone can include more than one control node 254. A control node 254 can be included in more than one zone. In the example illustrated in FIG. 3C, VM1 36A has been configured to create a routing session 310 with control node 2 254B by specifying the zone "Z2" when creating the routing session 310. Similarly, VM2 36B has been configured to create a routing session 314 with control node 3 254C. by specifying the zone "Z3" when creating the routing session 314. Thus, a user can configure a redundant service 312 such that the control nodes 254 selected to manage the routers and switches that route data to and from the VMs 36 are not a single point of failure by specifying different zone IDs for each of the control nodes and routing associations.

Figure 3D:
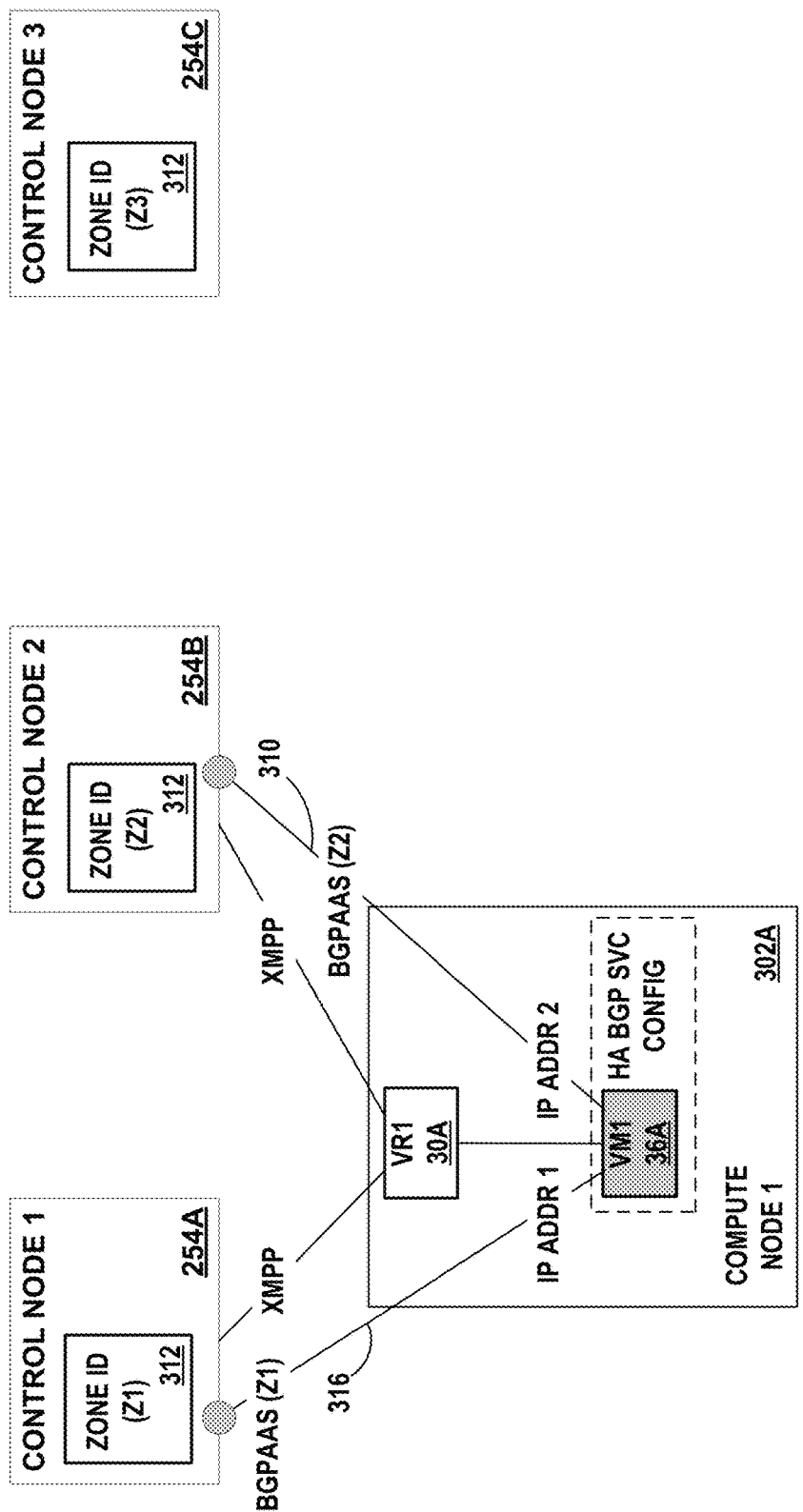

FIG. 3D illustrates an example deterministic routing association that provides high availability routing. In the example illustrated in FIG. 3D, VM1 36A has been configured to use two IP addresses (IP ADDR 1 and IP ADDR 2) for routing purposes and to utilize the routing management services provided by two control nodes 254A and 254B such that the routing management functions provided by control nodes 254A and 254B are highly available. In particular, VM1 36A has established two routing associations 316 and 310 with control node 1 254A and control node 2 254B respectively. VM1 36A can specify different zones for each of the routing associations (e.g., zones "Z1" and "Z2") to ensure that VM1 36A is bound to two different control nodes 254A and 254B. This may result in the control nodes 254A and 254B not being a single point of failure.

Figure 3E:
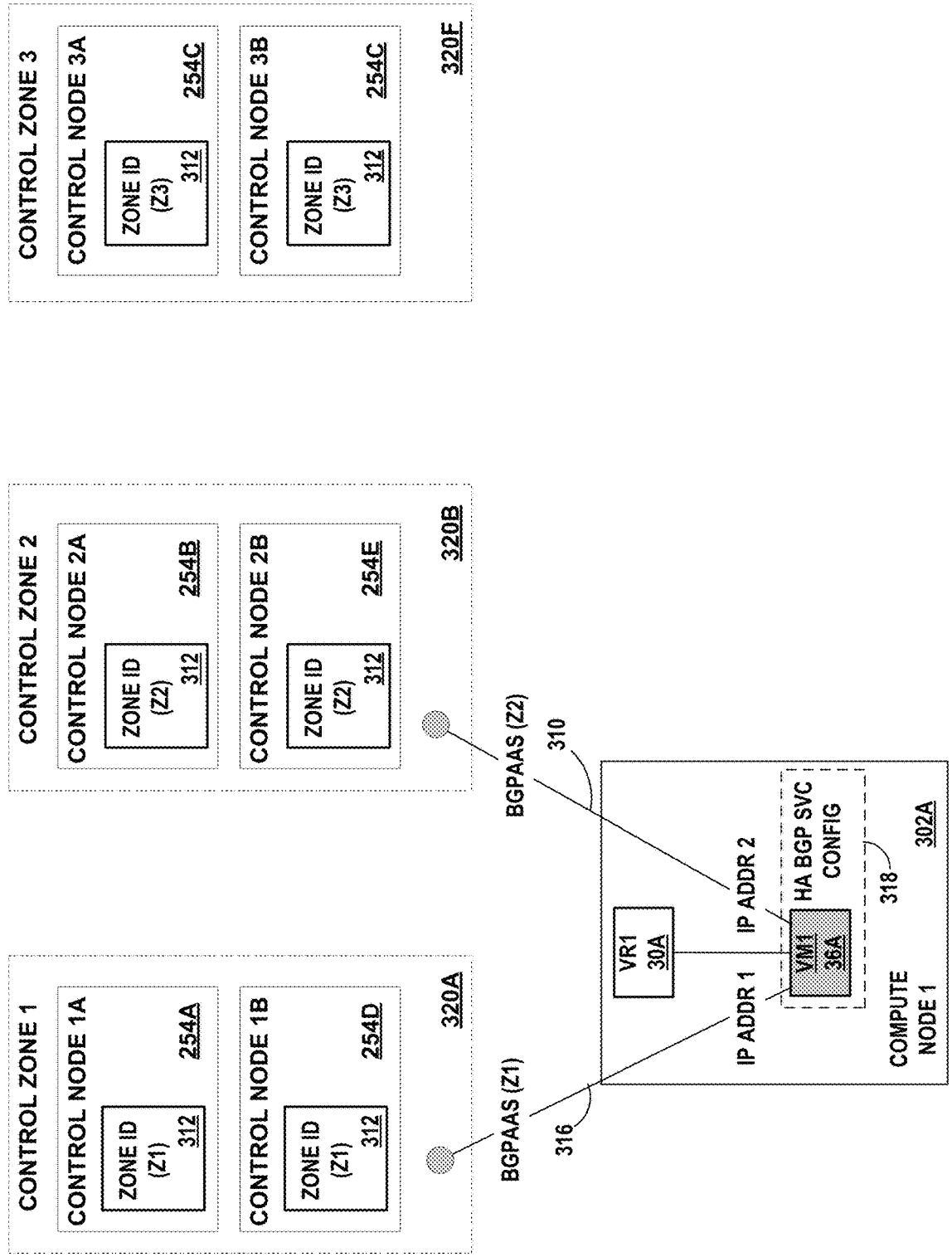

FIG. 3E illustrates an example deterministic routing association that provides high availability routing management services with redundancy and scaling capability within a zone. The example illustrated in FIG. 3E is similar to that described above with respect to FIG. 3D. VM1 36A has been configured to use two IP addresses (IP ADDR 1 and IP ADDR 2) for routing purposes and to utilize the routing management services provided by two control nodes 254A and 254B such that routing management services are highly available. VM1 36A can specify different zones for each of the routing associations (e.g., "Z1" and "Z2") to ensure that VM1 36A is bound to two different control nodes 254A and 254B. Additionally, each of the zones 320A, 320B and 320C may include multiple control nodes 254. For instance, zone "Z1" 320A includes two control nodes 254A and 254D. In some aspects, control node 254D can be configured as a redundant control node with respect to control node 254A such that control node 254D can take over operations of control node 254A should control node 254A fail. In some aspects, control node 254D can provide routing management services in conjunction with control node 254A in order to provide load balancing capability within zone 32A or to provide scale out capability within zone 320A. Control node 254E in zone "Z2" 320B and control node 254F in zone "Z3" 320C may provide similar capabilities as control node 254D for their respective zones. The example illustrated in FIG. 3E shows two control nodes 254 in each zone 320A-C. A zone can include more than two control nodes 254, and different zones may have differing numbers of assigned control nodes 254.

Figure 3F:
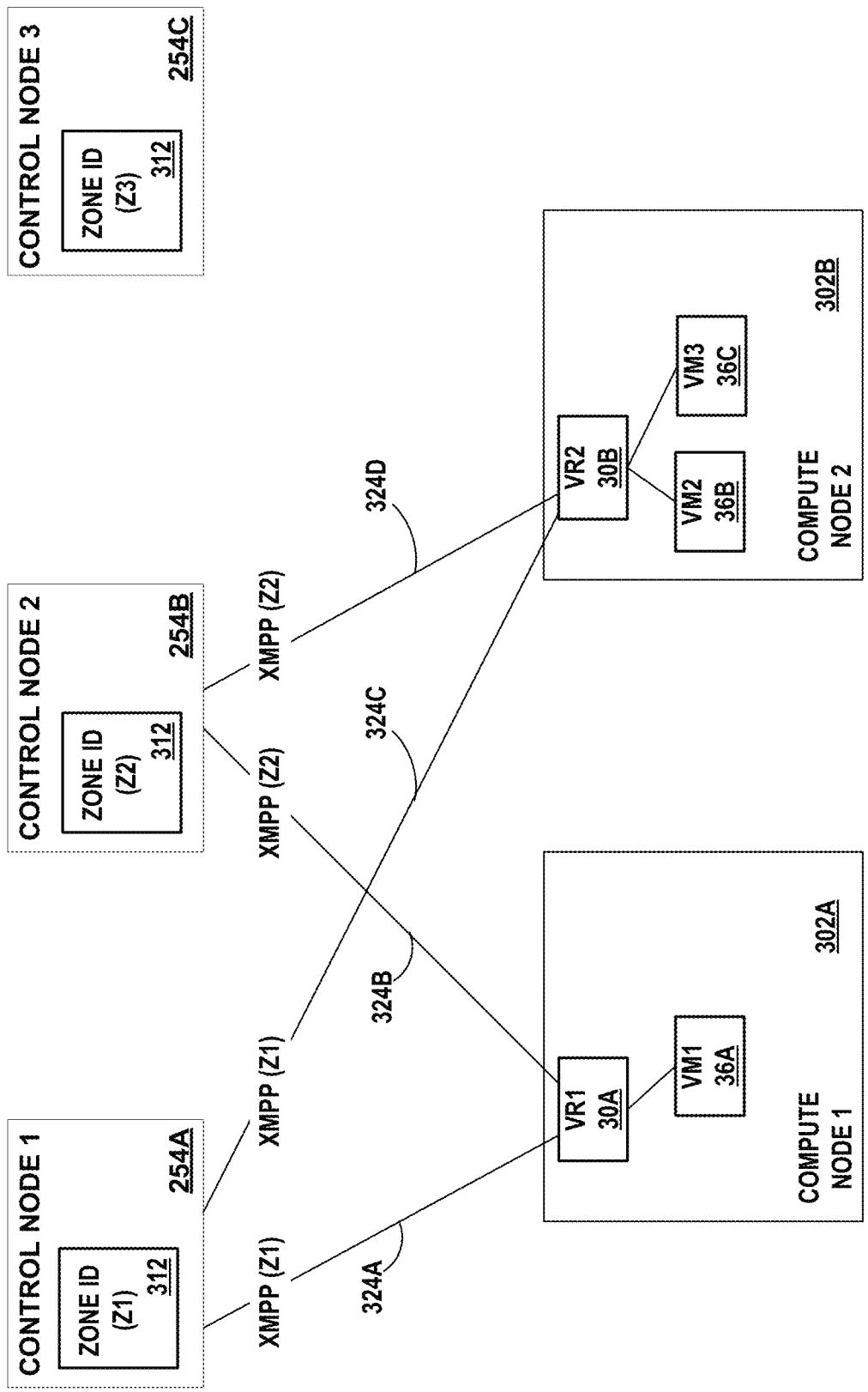

The discussion above has been presented primarily in the context of providing deterministic BGPaaS associations between a virtual machine and a control node. However, other aspects include providing deterministic associations for other protocols and entities. FIG. 3F illustrates example deterministic associations between control nodes 254 and virtual routers 30 using the above-describe zone ID 312. In the example illustrated in FIG. 3F, VR1 30A exchanges data with control nodes 254A and 254B via XMPP channels 324A and 324B respectively. VR1 30A can be configured to specify a zone ID when establishing XMPP channels with a control node. For example, VR1 30A can be configured such that XMPP communications channel 324A is assigned to a control node in zone "Z1" (e.g., control node 254A), and XMPP communications channel 324B is assigned to a control node in zone "Z2" (e.g., control node 254B). VR2 30B has a similar configuration with respect to XMPP channels 324C and 324D. In some aspects, a zone ID can be configured for an XMPP session. In further aspects, a zone ID can be communicated to a VR for use in establishing an XMPP session. For example, a control node or a workload can communicate a zone ID to an associated VR.

Figure 4:
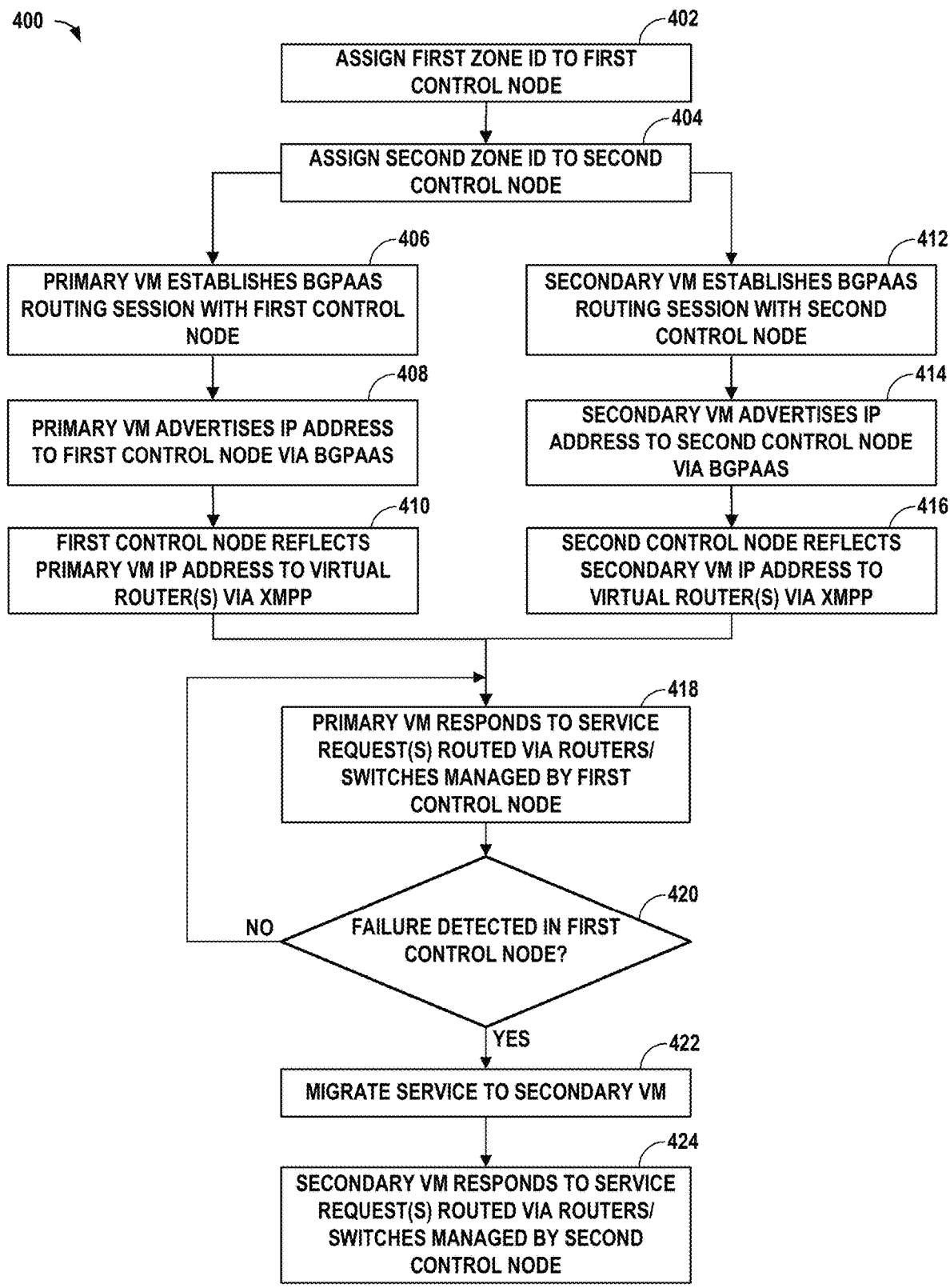
FIG. 4 is a flowchart illustrating operations of a method for binding control nodes in an SDN to avoid a single point of failure in a high availability service in accordance with techniques described herein.

FIG. 4 is a flowchart illustrating operations of a method for binding control nodes in an SDN to avoid a single point of failure in a high availability service in accordance with techniques described herein. Mode of operation 400 is described with respect to virtual machines but can be used for managing other workloads, such as containers. The operations may begin by assigning zone IDs to control nodes. For example, a first zone ID can be assigned to a first control node (402), and a second zone ID may be assigned to a second control node (404). The assignment of a zone ID to a control node may be determined according to a configuration of an SDN system. The zone ID can be an attribute or property of a control node.

A primary VM and a secondary VM may be configured to provide a redundant service. As discussed above, the redundant service may be a high availability service, a load balanced service etc. In the example operations of FIG. 4, the primary VM and secondary VM may be configured to provide a high availability service.

The primary VM can establish a BGPaaS routing session with the first control node (406). In some aspects, the primary VM can be configured to associate a zone ID with a BGPaaS routing session. For example, the zone ID can be a property or attribute of the BGPaaS configuration for the primary VM. The primary VM can specify the configured zone ID when establishing the BGPaaS routing session so that the session is established with a control node in a zone having the specified zone ID.

The primary VM can advertise one or more IP addresses associated with the primary VM to the first control node via the BGPaaS routing session (408). After receiving the one or more IP addresses, the first control node can reflect (e.g., push) a routing configuration including the one or more IP addresses to virtual routers (410). In some aspects, XMPP channels can be used to communicate the routing configuration from the first control node to the virtual routers connected to the first control node.

The secondary VM can perform similar operations to the primary VM. The secondary VM can establish a BGPaaS routing session with the second control node (412). In some aspects, the secondary VM can be configured to associate a zone ID with a BGPaaS routing session. For example, the zone ID can be a property or attribute of the BGPaaS configuration for the secondary VM. The secondary VM can specify the configured zone ID when establishing the BGPaaS routing session so that the session is established with a control node in a zone having the specified zone ID.

The secondary VM can advertise one or more IP addresses associated with the secondary VM to the second control node via the BGPaaS routing session (414). After receiving the one or more IP addresses, the second control node can reflect (e.g., push) a routing configuration including the one or more IP addresses to virtual routers (416). In some aspects, XMPP channels can be used to communicate the routing configuration from the second control node to the virtual routers connected to the second control node.

The high availability service provided by the primary VM and secondary VM may be made available to clients after the above described operations have been performed. The primary VM can respond to service requests receive via the first control node (418). The service requests may be routed through the first control node and VRs connected to the first control node.

The high availability service may continue to be provided by the first control node until a failure is detected in the first control node (420). The failure may be a total failure, such as a loss of power to a server hosting the control node or an operating system crash on a physical or virtual machine hosting the control node. The failure may be a partial failure, for example, the inability of the first control node provide routing management services in a timely manner due to resource limitations, transient errors, etc.

Upon detecting a failure of the first control node, the SDN system can migrate the high availability service to the secondary VM (422). For example, the SDN system may change IP addresses associated with the high availability service to IP addresses associated with the secondary VM. The secondary VM can then respond to service requests receive via routers and switches managed by the second control node (424). For example, the service requests may be routed through VRs managed by the second control node.

Figure 5:
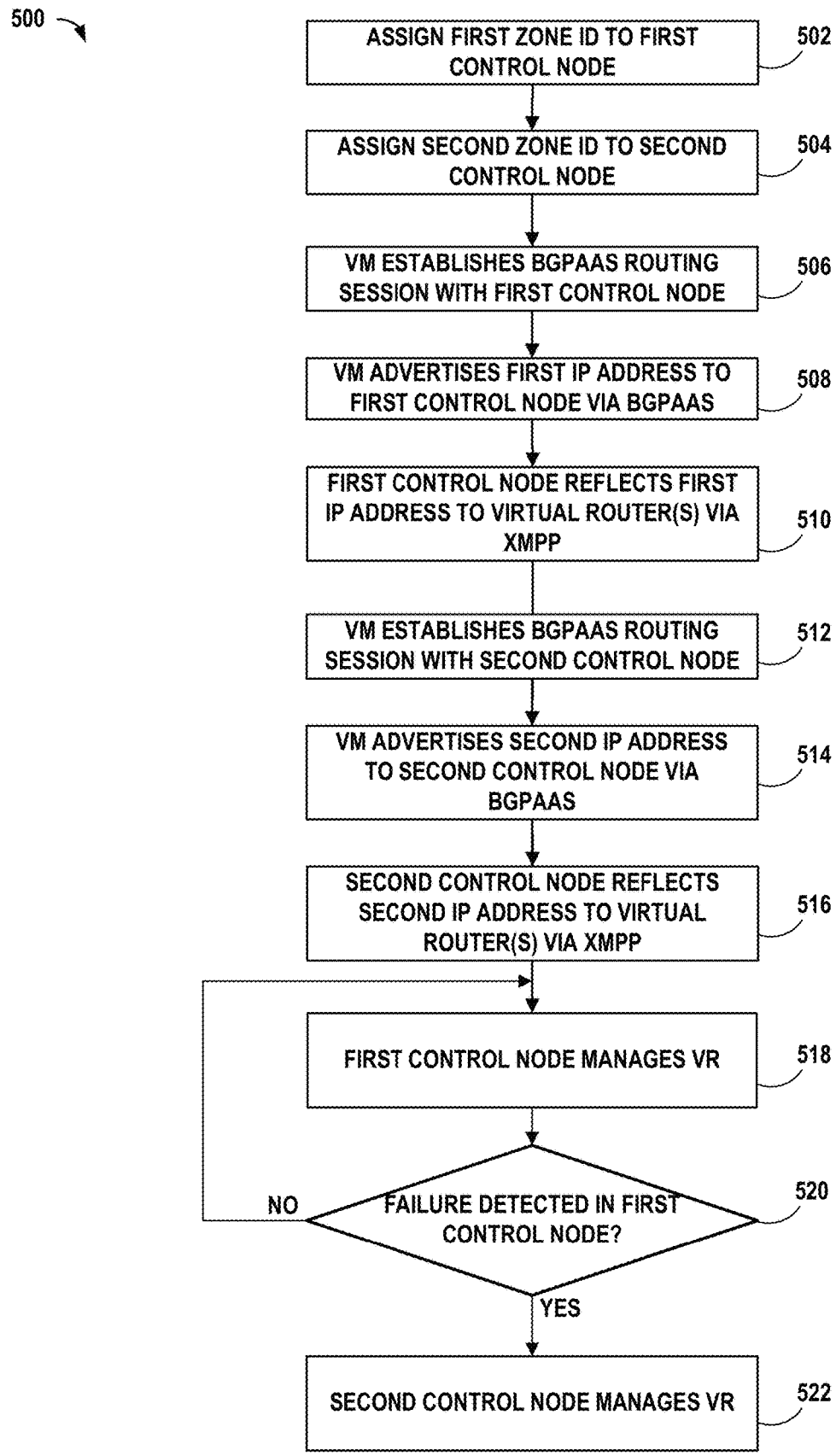
FIG. 5 is a flowchart illustrating operations of a method for binding control nodes in an SDN to avoid a single point of failure in a control node providing routing for the SDN in accordance with techniques described herein.

FIG. 5 is a flowchart illustrating operations of a method for binding control nodes in an SDN to avoid a single point of failure in a control node providing routing for the SDN in accordance with techniques described herein. The operations may begin by assigning zone IDs to control nodes. For example, a first zone ID can be assigned to a first control node (502), and a second zone ID may be assigned to a second control node (504). As noted above, the assignment of a zone ID to a control node may be determined according to a configuration of an SDN system. The zone ID can be an attribute or property of a control node.

A virtual machine can establish redundant BGPaaS routing sessions. For example, the VM can establish a first BGPaaS routing session with a first control node (506). In some aspects, the VM can be configured to associate a first zone ID with the first BGPaaS routing session. For example, the first zone ID can be a property or attribute of the first BGPaaS configuration for the VM. The VM can specify the first configured zone ID when establishing the first BGPaaS routing session so that the first session is established with a control zone having the specified zone ID.

The VM can advertise a first IP address associated with the VM to the first control node via the BGPaaS routing session (508). After receiving IP address, the first control node can reflect (e.g., push) a routing configuration including the IP address to virtual routers (510). In some aspects, XMPP channels can be used to communicate the routing configuration from the first control node to the virtual routers connected to the first control node.

The VM can establish a second BGPaaS routing session with a second control node in a different zone such that the first control node and the second control node are located on different virtual or physical machines. In some aspects, the VM can be configured to associate a second zone ID with the second BGPaaS routing session. For example, the second zone ID can be a property or attribute of the second BGPaaS configuration for the VM. The VM can specify the second configured zone ID when establishing the second BGPaaS routing session so that the first session is established with a control zone having the specified zone ID.

The VM can advertise a second IP address associated with the VM to the second control node via the second BGPaaS routing session (514). After receiving IP address, the second control node can reflect (e.g., push) a routing configuration including the second IP address to virtual routers (510). In some aspects, XMPP channels can be used to communicate the routing configuration from the second control node to the virtual routers connected to the second control node.

The VM can send and receive data that can be routed via routers and switches managed by the first control node (518). For example, the data may be routed through a VR managed by the first control node and communicably coupled to the VM.

Data may be sent and received by the VM via routers and switches managed by the first control node until a failure is detected in the first control node (520). The failure may be a total failure, such as a loss of power to a server hosting the first control node or an operating system crash on a physical or virtual machine hosting the first control node. The failure may be a partial failure, for example, the inability of the first control node to route the request in a timely manner due to resource limitation, transient errors, etc.

Upon detecting a failure of the first control node, the second control node can be configured to take over management of the switches and routers that exchange data with the VM (522). For example, the second control node can assume management of the VR communicably coupled to the VM.

Figure 6:
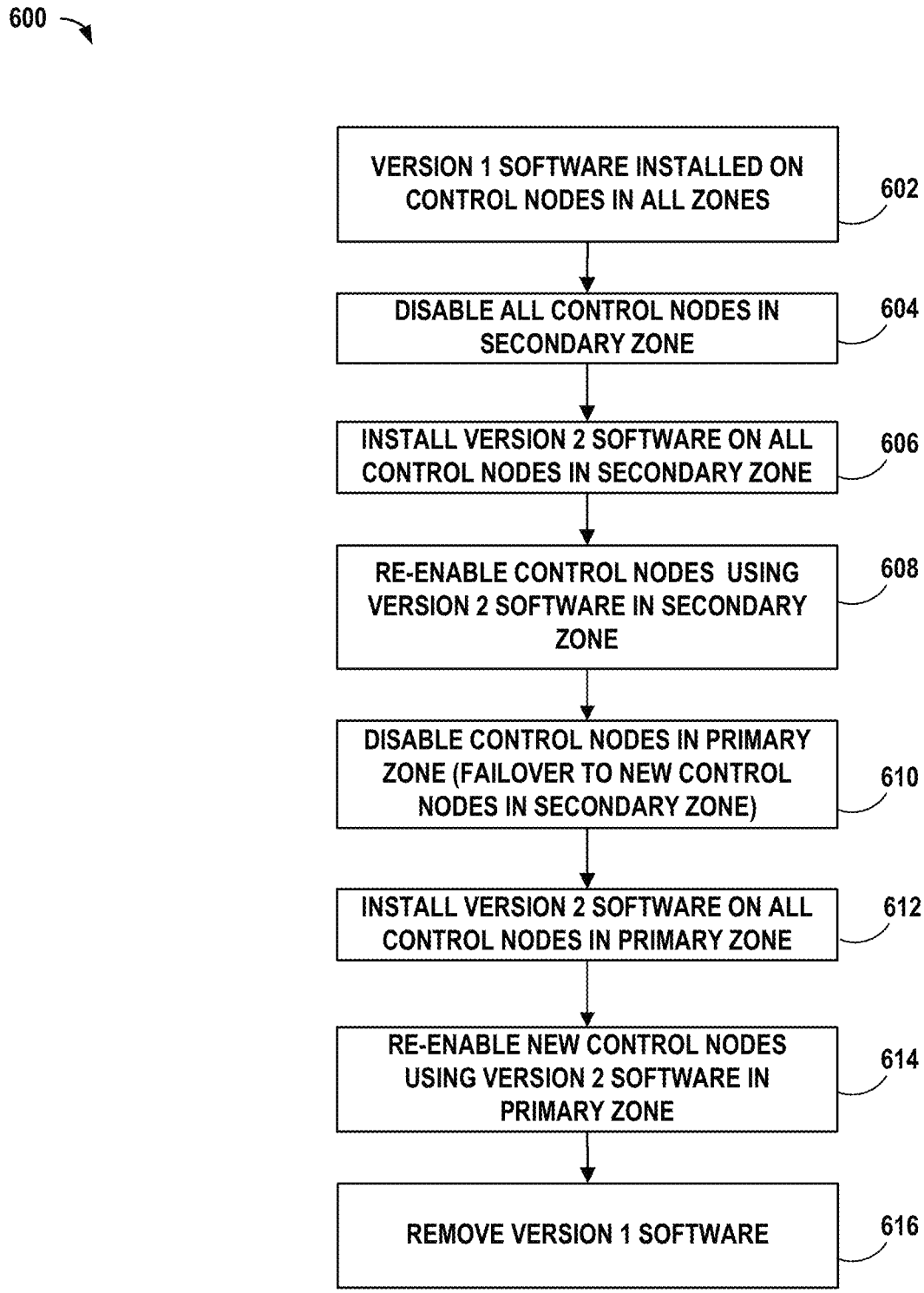
FIG. 6 is a flowchart illustrating operations of a method for binding control nodes while performing a software upgrade in accordance with techniques described herein.

FIG. 6 is a flowchart illustrating operations of a method for binding control nodes while performing a software upgrade in accordance with techniques described herein. In the example illustrated in FIG. 6, a first version of software is installed on control nodes in all zones configured for an SDN (602). Further, the control nodes may be configured to reside in two zones, a primary zone and a secondary zone. The primary zone and secondary zone may be in addition to other zones assigned to the control nodes. The first version of the software may comprise an operating system, application, daemon, process, thread etc. for the control node. A second version of the software may become available (e.g., a new, different or upgraded version of the software). The second version of the software can be installed in a two phase technique as follows.

The first phase can begin by disabling the control nodes in the secondary zone (604). The second version of the software can be installed on the control nodes in the secondary zone (606). The control nodes in the secondary zone can then be re-enabled (608).

The second phase can begin by disabling the control nodes in the primary zone (610). Services configured as high availability services on VMs that utilize control nodes in the primary zone may fail over to secondary VMs that utilize control nodes in the secondary zone. The second version of the software can be installed on the control nodes in the primary zone (612). The primary control nodes can then be re-enabled and resume operation (614).

At this point, the second version of the software may be installed on all control nodes in an SDN system. The first version of the software may optionally be removed (616).

Various modifications may be applied to the above-described techniques. For example, zone IDs can be used to define control node groups with a group affinity at the compute node level to delegate routing in a workload or compute plane.

Further, the above-described techniques have been presented in the context of an SDN system at a single site. The techniques can be extended to multi-site networking, where a same SDN cluster spans over several sites. In this case, designs may rely on dedicated site-specific SDN control node instances, to which routing associations may be established. The routing zone defined by a zone ID can facilitate mapping site-specific SDN control nodes to their respective dependent compute nodes.

Moreover, the techniques described herein can be extended to manage auto-meshing of protocols such as Resource Reservation Protocol (RSVP), Bi-directional Forwarding Detection (BFD) or BGP between a set of routers. For example, zone IDs can be configured such that that meshing happens between nodes in a same routing zone.

Figure 7A:
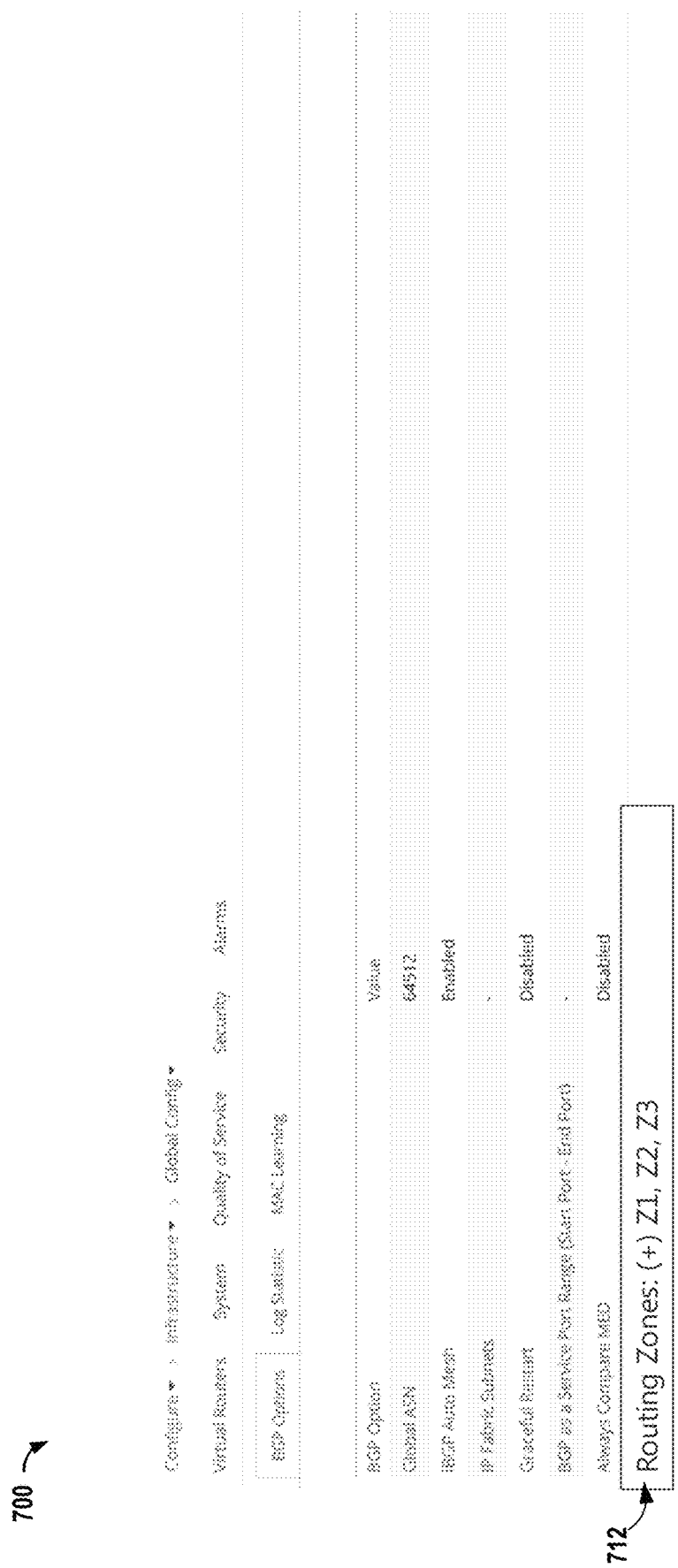
FIGS. 7A-7C are example user interface screens for configuring an SDN to avoid single points of failure in accordance with techniques described herein.
Figure 7B:
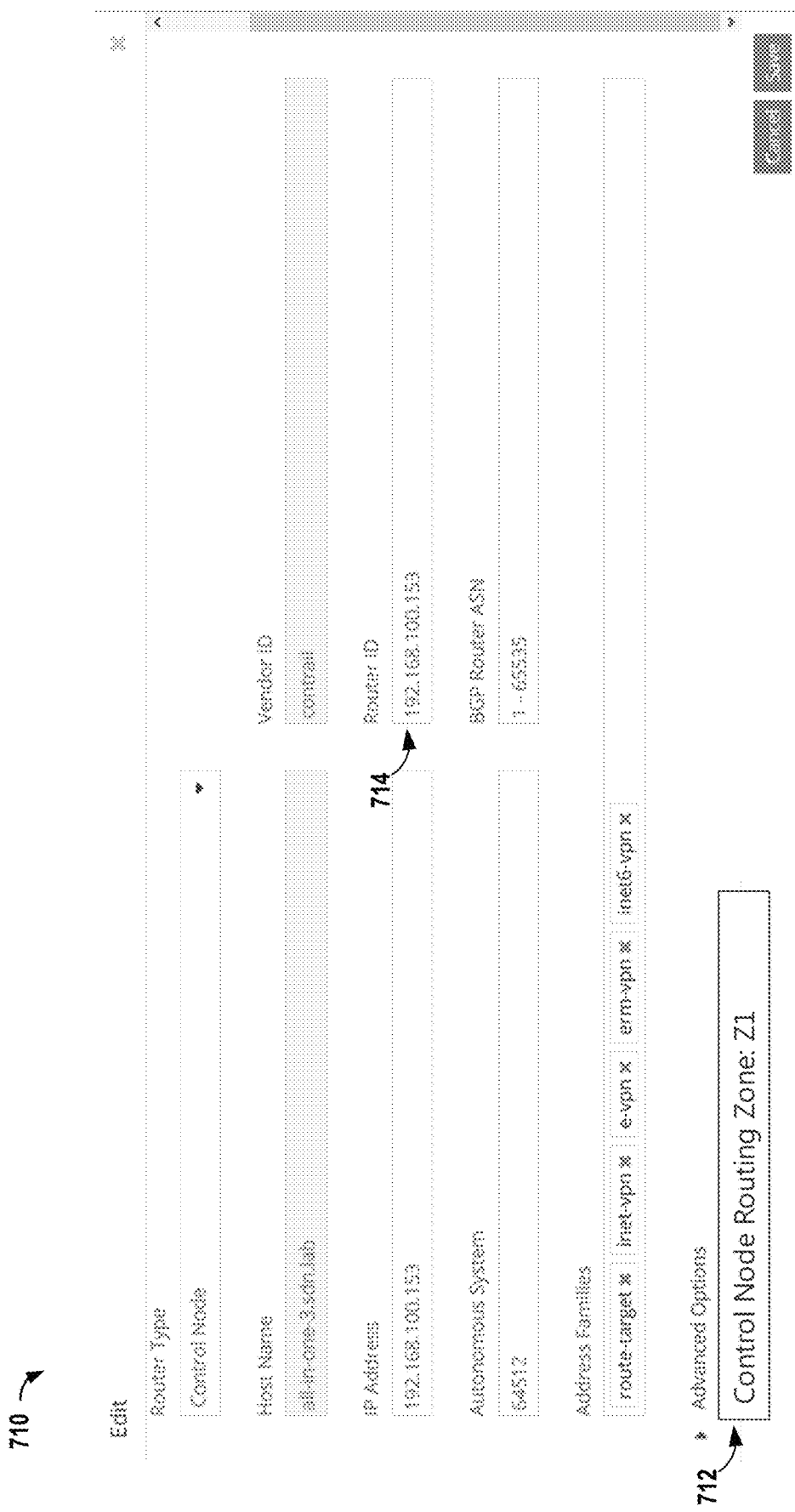
Figure 7C:
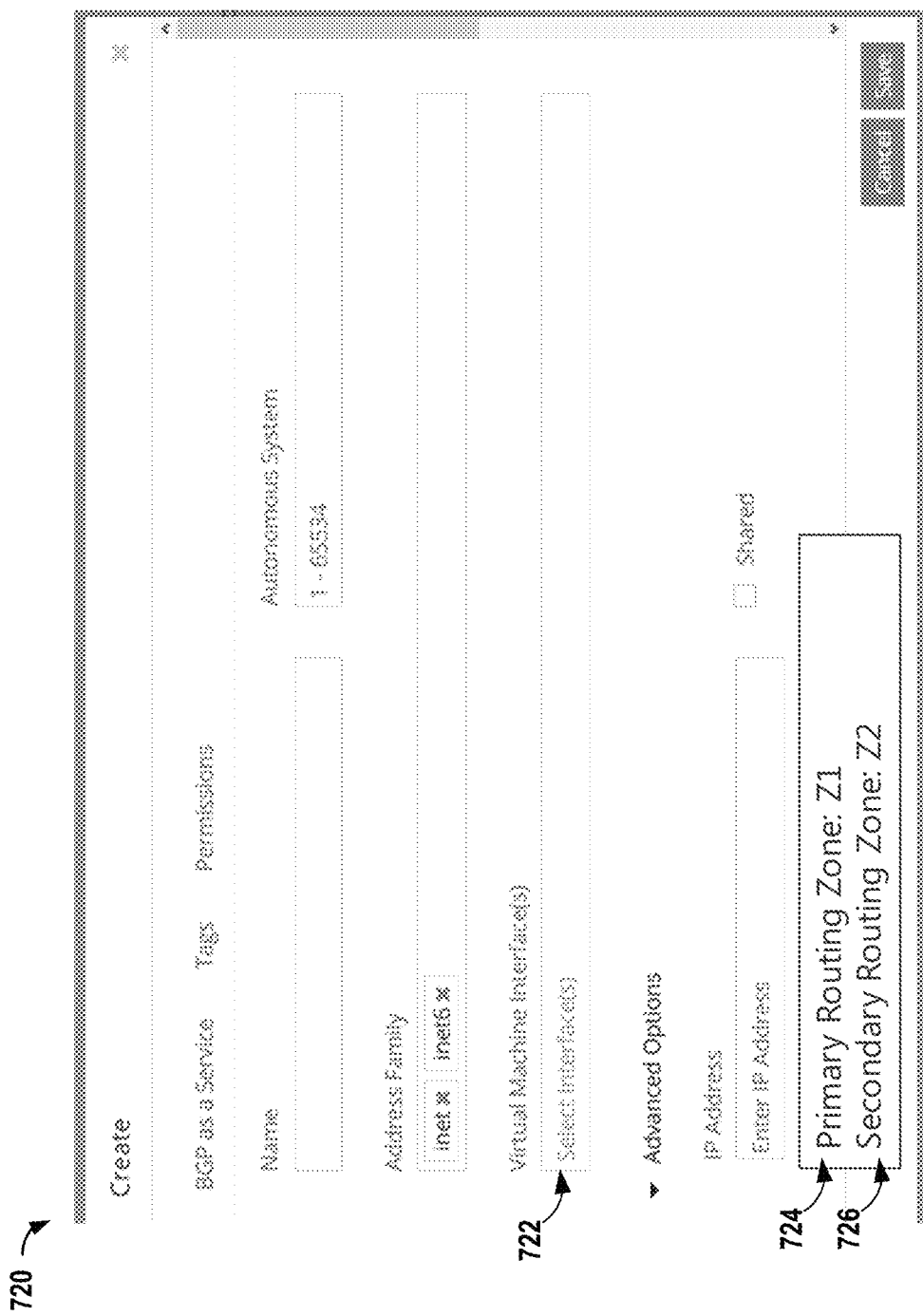

FIGS. 7A-7C are example user interface screens for configuring an SDN to avoid single points of failure in accordance with techniques described herein. FIG. 7A illustrates an example user interface screen 700 that includes a field 712 to receive user input that defines identifiers available for use in configuring control nodes and routing sessions. In the example illustrated in FIG. 7A, zones "Z1," "Z2," and "Z3" have been defined.

FIG. 7B illustrates an example user interface screen 710 for configuring a control node identified in field 714. The example user interface screen 710 includes a field 712 to receive user input that assigns zones to the identified control node. In the example illustrated in FIG. 7B, the identified control node has been assigned to zone "Z1." As noted previously, a control node can be assigned to more than one zone.

FIG. 7C illustrates an example user interface screen 720 for configuring a routing session for a virtual machine. The example user interface screen 720 includes a field 722 that identifies one or more virtual machine interfaces to be configured. Field 724 may receive input that identifies a primary routing zone to be assigned to routing sessions used by the identified virtual machine interfaces. Field 726 may receive input that identifies a secondary routing zone to be assigned to routing sessions used by the identified virtual machine interfaces.

The techniques described in this disclosure may be implemented, at least in part, in hardware, software, firmware or any combination thereof. For example, various aspects of the described techniques may be implemented within one or more programmable processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A method comprising:
    establishing, by a first workload, a first routing session with a first control node based, at least in part, on a first zone identifier, the first zone identifier identifying a first set of one or more control nodes, the first set of control nodes including the first control node, wherein the first workload is configured as a primary provider of a service;
    establishing, by a second workload, a second routing session with a second control node based, at least in part, on a second zone identifier, the second zone identifier identifying a second set of one or more control nodes, the second set of control nodes including the second control node, the second zone identifier different than the first zone identifier, wherein the first set of one or more control nodes are on different virtual or physical machines from the second set of one or more control nodes, wherein the second workload is configured as a secondary provider of the service;
    receiving one or more first service requests for the service by the first workload via a first virtual router managed by the first control node;
    in response to detecting a failure of the first control node, migrating the service to the second workload; and
    receiving one or more second service requests for the service by the second workload via a second virtual router managed by the second control node.

2. The method of claim 1, wherein establishing the first routing session comprises establishing a first Border Gateway Protocol as a Service (BGPaaS) routing session and wherein establishing the second routing session comprises establishing a second BGPaaS routing session.

3. The method of claim 2,
    wherein the first zone identifier comprises an attribute of a first BGPaaS configuration on the first workload, and wherein the first zone identifier is determined from the first BGPaaS configuration to establish the first BGPaaS session; and
    wherein the second zone identifier comprises an attribute of a second BGPaaS configuration on the second workload, and wherein the second zone identifier is determined from the second BGPaaS configuration to establish the second BGPaaS session.

4. The method of claim 1, further comprising:
    assigning the first zone identifier as an attribute of the first control node and communicating the first zone identifier to the first workload; and
    assigning the second zone identifier as an attribute of the second control node and communicating the second zone identifier to the second workload.

5. The method of claim 1, further comprising:
    establishing, by a third workload a third routing session with a third control node based, at least in part, on a third zone identifier;
    establishing, by the third workload, a fourth routing session with a fourth control node based, at least in part, on a fourth zone identifier;
    receiving, by the third workload, one or more third requests service requests for a second service provided by the third workload via a third virtual router managed by the third control node; and in response to detecting a failure of the third control node; configuring the fourth control node to manage the third virtual router.

6. The method of claim 1, further comprising:

establishing, by a third workload, a third routing session with a third control node based, at least in part, on the first zone identifier, wherein the first control node and the third control node are in the same zone identified by the first zone identifier, wherein the third control node provides redundant routing management services with respect to the first control node.

7. The method of claim 1, wherein a first set of control nodes are assigned a third zone identifier and a second set of control nodes are assigned a fourth zone identifier, wherein the first set of control nodes and the second set of control nodes execute a first version of software, and wherein the method further comprises:

disabling the second set of control nodes;

installing a second version of the software on the second set of control nodes; and reenabling the second of set of control nodes, wherein the second set of control nodes are configured to execute the second version of the software.

8. The method of claim 7, further comprising removing the first version of the software from one or more of the first set of control nodes and the second set of control nodes.

9. A Software Defined Network (SDN) system comprising:

a first control node assigned a first zone identifier, the first zone identifier identifying a first set of one or more control nodes, the first set of control nodes including the first control node;

a second control node assigned a second zone identifier, the second zone identifier identifying a second set of one or more control nodes, the second set of control nodes including the second control node, wherein the first set of one or more control nodes are on different virtual or physical machines from the second set of one or more control nodes;

a first workload configured to establish a first routing session with the first control node based, at least in part, on the first zone identifier, wherein the first workload is configured as a primary provider of a service; and a second workload configured to establish a second routing session with the second control node based, at least in part, on the second zone identifier, wherein the second workload is configured as a secondary provider of the service;

wherein the first workload is further configured to receive one or more first service requests via a virtual router managed by the first control node;

wherein the SDN system is configured to, in response to detection of a failure of the first control node, migrate the service to the second workload, wherein the second workload is further configured to receive one or more second service requests via a virtual router managed by the second control node.

10. The SDN system of claim 9, wherein the first routing session comprises a first Border Gateway Protocol as a Service (BGPaaS) routing session and wherein the second routing session comprises a second BGPaaS routing session.

11. The SDN system of claim 10, wherein the first zone identifier comprises an attribute of a first BGPaaS configuration on the first workload, and wherein the first zone identifier is determined from the first BGPaaS configuration to establish the first BGPaaS session; and wherein the second zone identifier comprises an attribute of a second BGPaaS configuration on the second workload, and wherein the second zone identifier is determined from the second BGPaaS configuration to establish the second BGPaaS session.

12. The SDN system of claim 9, wherein the SDN system is further configured to:

assign the first zone identifier as an attribute of the first control node; and assign the second zone identifier as an attribute of the second control node.

13. The SDN system of claim 9, further comprising:

a third workload configured to:

establish a third routing session with a third control node based, at least in part, on a third zone identifier, establish a fourth routing session with a fourth control node based, at least in part, on a fourth zone identifier, and receive one or more third requests service requests for a second service provided by the third workload via a third virtual router managed by the third control node;

wherein in response to detection of a failure of the third control node; the fourth control node is configured to manage the third virtual router.

14. The SDN system of claim 9, further comprising:

a third workload configured to establish a third routing session with a third control node based, at least in part, on the first zone identifier, wherein the first control node and the third control node are in the same zone identified by the first zone identifier, wherein the third control node provides redundant routing management services with respect to the first control node.

15. The SDN system of claim 9, wherein a first set of control nodes are assigned a third zone identifier and a second set of control nodes are assigned a fourth zone identifier, wherein the first set of control nodes and the second set of control nodes execute a first version of software, and wherein the SDN system is configured to:

disable the second set of control nodes;

install a second version of the software on the second set of control nodes;

re-enable the second of set of control nodes, wherein the second set of control nodes are configured to execute the second version of the software;

disable the first set of control nodes;

install the second version of the software on the first set of control nodes;

re-enable the first set of control nodes, wherein the first set of control nodes are configured to execute the second version of the software.

16. A method comprising:

establishing, by a first virtual router, a first communication session with a first control node based, at least in part, on a first zone identifier, the first zone identifier identifying a first set of one or more control nodes, the first set of control nodes including the first control node, wherein the first virtual router is configured to provide a first virtual network to a first workload configured as a primary provider of a service;

establishing, by a second virtual router, a second communication session with a second control node based, at least in part, on a second zone identifier, the second zone identifier identifying a second set of one or more control nodes, the second set of control nodes including the second control node, the second zone identifier different than the first zone identifier, wherein the first set of one or more control nodes are on different virtual or physical machines from the second set of one or more control nodes, wherein the second virtual router is configured to provide a second virtual network to a second workload configured as a secondary provider of the service;

receiving one or more first service requests for the service by the first workload via the first virtual router;

in response to detection of a failure of the first control node, migrating the service to the second workload; and receiving one or more second service requests for the service by the second workload via the second virtual router.

17. The method of claim 16, wherein the first communication session comprises a first Extensible Messaging and Presence Protocol (XMPP) session and wherein the second communication session comprises a second XMPP session.

18. The method of claim 17,
wherein the first zone identifier comprises an attribute of a first XMPP session configuration, and wherein the first zone identifier is determined from the first XMPP configuration to establish the first XMPP session; and wherein the second zone identifier comprises an attribute of a second XMPP session configuration, and wherein the second zone identifier is determined from the second XMPP configuration to establish the second XMPP session.

19. The method of claim 16, further comprising:
assigning the first zone identifier as an attribute of the first control node;
communicating the first zone identifier to the first virtual router;
assigning the second zone identifier as an attribute of the second control node; and
communicating the second zone identifier to the second virtual router.

20. The method of claim 16, further comprising:
establishing, by a third virtual router, a third communication session with a third control node based, at least in part, on a third zone identifier, wherein the third control node is configured to manage the third virtual router;
establishing, by the third virtual router, a fourth communication session with a fourth control node based, at least in part, on a fourth zone identifier; and
in response to detection of a failure of the third control node, configuring the fourth control node to manage the third virtual router.

* * * * *